United States Patent Office 3,419,324
Patented Dec. 31, 1968

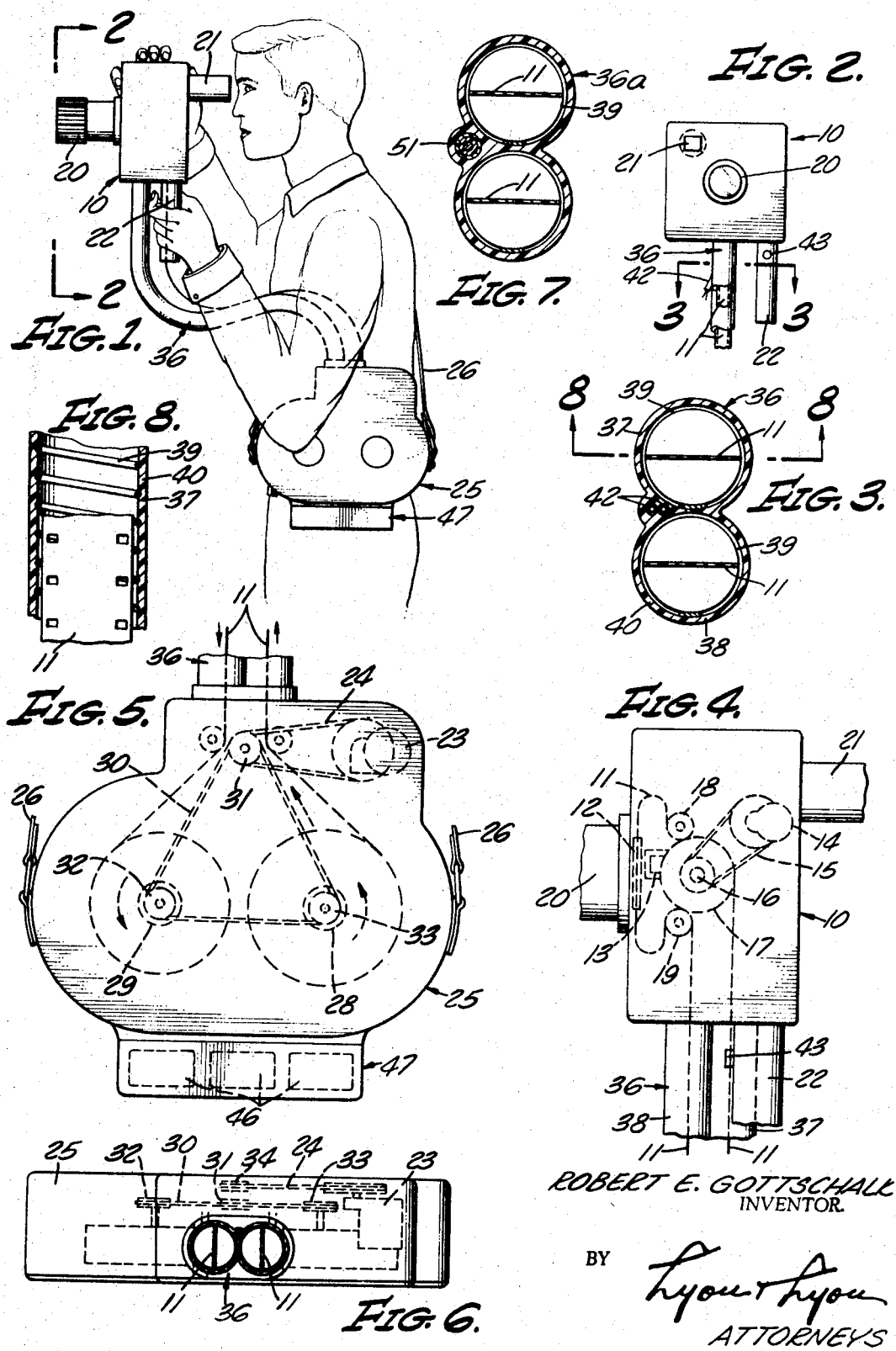

3,419,324
MOTION PICTURE CAMERA WITH REMOTE
FILM MAGAZINE
Robert E. Gottschalk, Los Angeles, Calif., assignor to
Panavision, Incorporated, Los Angeles, Calif., a corporation of California
Filed Aug. 23, 1965, Ser. No. 481,566
1 Claim. (Cl. 352—75)

ABSTRACT OF THE DISCLOSURE

A hand-held motion picture camera is provided with a remote film magazine having power driven supply and take-up reels, and a pair of flexible hoses extend from the magazine to the camera, each hose having a circular opening so that the film may travel from the supply reel through one of the hoses to the camera and back through the other hose to the take-up reel, with only the edges of the film contacting the hoses.

---

This invention relates to motion picture cameras and is particularly directed to a hand-held camera having a remote film magazine.

Conventional hand-held motion picture cameras of professional quality have considerable weight and bulk. Both the weight and bulk are objectionable because they make it difficult for the cameraman to support the camera in his hands in steady position and because the camera cannot be placed in tight quarters having only restricted space. Briefly stated, the present invention is directed to the hand-held motion picture camera having a remote film magazine and having flexible hoses connecting the camera to the remote magazine, through which hoses the motion picture film passes. The magazine may be carried on a sling passing over the shoulder of the cameraman. The weight of the film magazine and driving motor are thus removed from the camera thereby substantially reducing its weight and overall size. The hoses are circular in cross section and each has a helical wire defining the internal surface thereof. Only the edges of the film can touch these interior surfaces of the hoses. Moreover, by locating the film driving motor at a remote location the noise of the camera may be substantially eliminated.

Other and more detailed objects and advantages will appear hereinafter.

In the drawings, FIGURE 1 is a side elevation showing a preferred embodiment of the invention.

FIGURE 2 is a front elevation taken in the direction of the lines 2—2 and partly broken away.

FIGURE 3 is a sectional plan view taken substantially on the lines 3—3 as shown in FIG. 2.

FIGURE 4 is a side elevation of the camera, the interior parts being diagrammatically shown in dashed lines.

FIGURE 5 is a side elevation of the film magazine containing both the film supply reel and the film pickup reel.

FIGURE 6 is a plan view of the film magazine.

FIGURE 7 is a sectional view similar to FIGURE 3, showing a modification.

FIGURE 8 is a sectional view taken substantially on lines 8—8 as shown on FIGURE 3.

Referring to the drawings, the motion picture camera 10 has conventional internal mechanism for advancing motion picture film 11 through a film gate 12 by intermittent motion. The "movement" 13 which controls intermittent advancing of the film 11 through the gate 12 is driven from the electric motor 14 by conventional apparatus such as the film 15 and the shaft 16. The shaft 16 also drives the sprocket 17 which controls the rate of feed-in and take-up of the film 11, in cooperation with the usual rollers 18 and 19. The camera is provided with an adjustable lens assembly 20 and an eyepiece 21. A post 22 on the camera case is provided for convenient manual grasp by one hand of the cameraman.

A film magazine generally designated 25 is positioned at the remote location with respect to the camera. As shown in the drawings, this magazine 25 is supported by a strap 26 passing over the shoulder of the cameraman. Within the interior of the magazine are provided a conventional film supply reel 28 and a conventional film take-up reel 29. These reels are driven by means of a flexible belt 30 traveling over pulleys 31, 32 and 33. The pulley 31 is driven by electric motor 23 through belt 24 and pulley 34. The belt 30 slips on the pulleys 32 and 33 in a conventional manner to compensate for the differences in rotational speed of the reels 28 and 29 during operation.

A dual hose device 36 extends from the top of the film magazine 25 to the bottom of the camera 10. This device comprises a pair of flexible hoses 37 and 38 joined side by side and each having a circular opening of greater diameter than the width of the film 11. The circular opening in each hose is defined by an internal helical metal wire 39, which is contacted by only the edges of the film. An elastomeric cover 40 encloses the wire 39 to form a dust-proof light-proof tube. The interiors of the hoses 37 and 38 are free of rollers or supporting devices and the film therefore travels through the hoses without any possibility of scratching either face thereof. If desired, a pair of electrical leads 42 may be carried in the hose device 36 to supply power to the camera motor 14. A suitable switch 43 is provided for energizing the camera motor 14 when desired. The camera motor 14 and the magazine motor 23 are electrically synchronized by conventional means for simultaneous operation. Power for both motors may be supplied by batteries 46 mounted in a removable pack 47 on the film magazine 25. The camera motor 14 is very small and operates with minimum noise. The film magazine motor 23 is larger but the film magazine may be insulated by conventional means to minimize radiation of sound from this motor.

Since the weight and bulk of the film magazine 25 has been removed from the hand-held camera and since the camera motor 14 is substantially smaller than that normally required for driving both the camera and the film magazine parts, the camera may be constructed of minimum weight and size.

The mounting of the film driving motor 23 at a remote location with respect to the camera 10 minimizes noise at the camera; the small motor 14 for the camera movement is practically noiseless.

In the modified form of the invention shown in FIGURE 7, the electrical lead wires 42 are eliminated, and the small camera motor 14 is not used. Instead a silent flexible shaft assembly 51 is driven from the film driving motor 32 and extends along the dual hose device 36a to operate the camera movement. In other respects this form of the invention is the same as that previously described.

Having fully described my invention, it is to be understood that I am not to be limited to the details herein set forth but that my invention is of the full scope of the appended claims.

I claim:

1. In a motion picture camera assembly, the combination of: a camera adapted to be held in the hands of the cameraman, the camera having a film gate and an intermittent motion device for advancing motion picture film through the gate, a remote magazine containing a film supply reel and a film take-up reel, a motor for turning both of said reels, means including a flexible shaft driven by the motor for driving the intermittent motion device, and a pair of flexible hoses each extending from the magazine to the camera, each hose having a circular opening of greater diameter than the width of the film, whereby the film may travel from the supply reel through one of said hoses to the camera and back through the other hose to the take-up reel, with only the edges of the film contacting the hoses.

References Cited

UNITED STATES PATENTS

| | | | |
|---|---|---|---|
| 2,890,619 | 6/1959 | Waller | 242—71.2 X |
| 2,229,861 | 1/1941 | McNabb | 352—243 X |
| 3,279,666 | 10/1966 | Graves | 352—243 |
| 2,868,067 | 1/1959 | Schwimmer | 352—75 |
| 2,986,169 | 5/1961 | McCormick | 138—122 X |

NORTON ANSHER, *Primary Examiner.*

M. H. HAYES, *Assistant Examiner.*

U.S. Cl. X.R.

242—55.13